Oct. 16, 1928.  E. E. DRUMM  1,688,039
COOKING UTENSIL
Filed Feb. 5, 1926
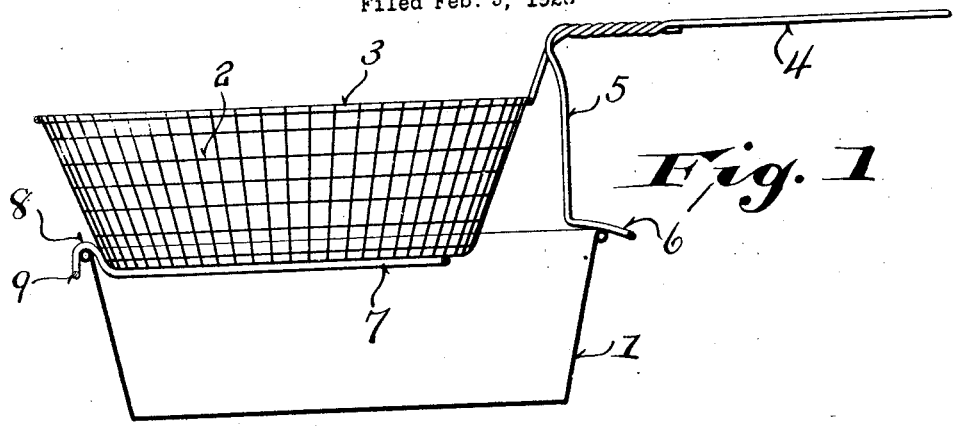
*Fig. 1*
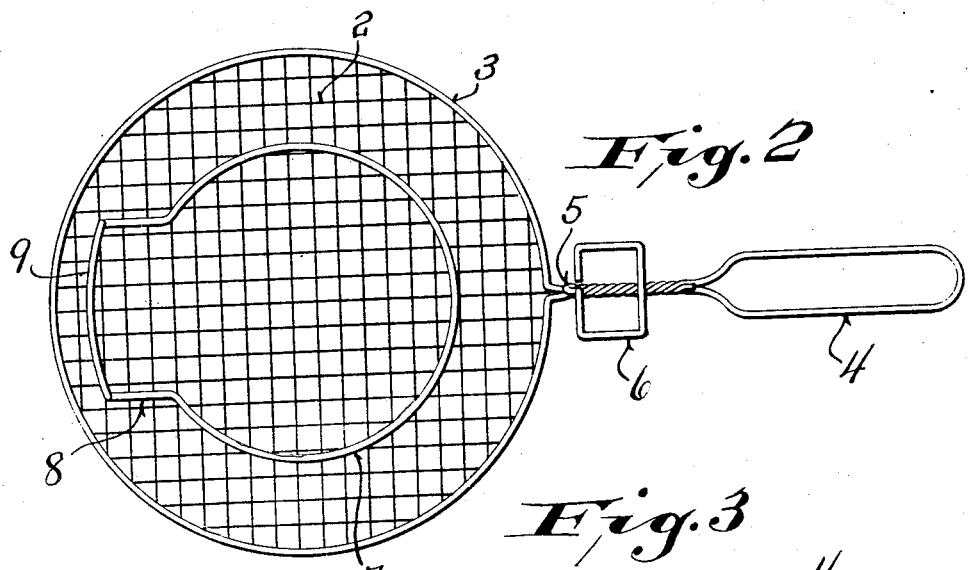
*Fig. 2*
*Fig. 3*
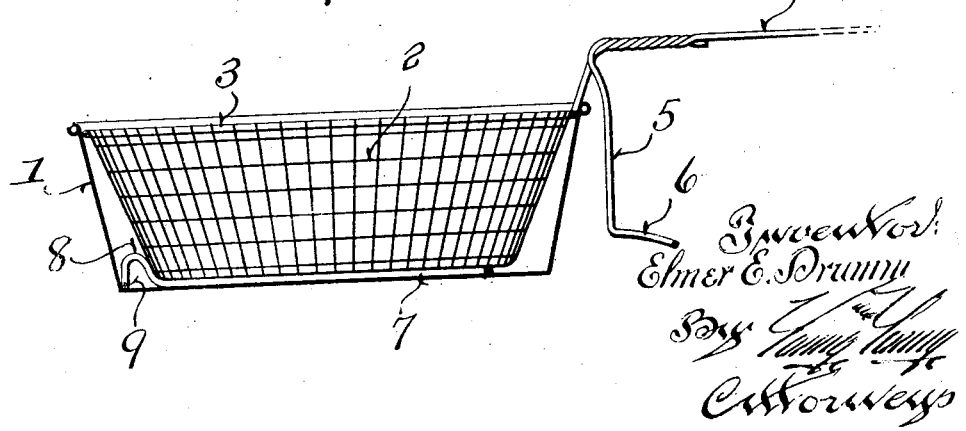
Inventor:
Elmer E. Drumm
By
Attorneys Patented Oct. 16, 1928.

1,688,039

UNITED STATES PATENT OFFICE.

ELMER E. DRUMM, OF MANITOWOC, WISCONSIN, ASSIGNOR TO ALUMINUM GOODS MANUFACTURING COMPANY, OF MANITOWOC, WISCONSIN.

COOKING UTENSIL.

Application filed February 5, 1926. Serial No. 86,245.

This invention relates to cooking utensils.

In cooking utensils attempts have been made to provide a basket in combination with a vessel so that the basket may be placed within the vessel or may be lifted outwardly and propped upon the handle of the vessel, for instance, or otherwise fastened to the side of the vessel.

These attempts have not been wholly satisfactory for the reason that the basket necessarily must be used with a vessel provided with a handle or else an auxiliary apparatus must be employed for holding the basket above the vessel when it is desired to lift the basket therefrom, or else the basket must be so made that it cannot be bodily moved down into the vessel.

This invention is designed to overcome the above noted defects and objects of such invention are to provide a cooking apparatus in which a vessel and basket are employed, and in which the basket is so constructed that it may be rested upon the rim of the vessel and supported wholly from such rim, or may be bodily shifted slightly and lowered into the vessel so that it is positioned completely within the vessel.

Further objects are to provide a basket of the type described above which does not have to be used with a vessel provided with a handle as it rests wholly upon the rim of the vessel, and may be rested at any point upon the rim.

Further objects are to provide a basket having a three point bearing adapted to rest upon the rim of an open vessel to secure stability, and in which a pair of outwardly projecting prongs adjacent the bottom of the basket are employed and have their outer ends joined so that the baskets may be nested one into the other in shipping without danger of the prongs catching and tearing adjacent baskets.

Further objects are to so construct the basket that the attaching means for the prongs or hooks stiffen the baskets and increase its strength and also provide means for holding the basket slightly spaced from the bottom of the vessel when the basket is positioned within the vessel.

An embodiment of the invention is shown in the accompanying drawings, in which:—

Figure 1 is a sectional view through the basket and vessel.

Figure 2 is a bottom view of the basket.

Figure 3 is a sectional view through the vessel and basket showing the parts in a different position from that illustrated in Figure 1.

Referring to the drawings, it will be seen that the vessel 1 may be of any desired type and need not be provided with a handle as has heretofore been necessary with devices of this type. Instead, any open top vessel may be employed.

The basket consists of a wire body portion 2 of open mesh and provided with side walls and a bottom. The upper rim 3 of the basket is reenforced, as shown in the drawings and the wires forming the bead or marginal edge of the basket continue rearwardly to form the handle 4. From this handle a downwardly extending arm 5 projects and is spaced outwardly from the side walls of the basket, as shown in Figures 1 and 3. This arm terminates in a supporting foot 6 which is spaced a material distance from the side walls of the basket for a purpose hereinafter to appear. The bottom of the basket has secured thereto a ring 7 whose ends project outwardly and are formed into hooks 8. These hooks are joined by a bridge piece or member 9. The members 9, 8 and 7 may be made of a single piece of wire of integral formation.

In using the device the basket may be positioned above the vessel by resting the hooks 8 and the foot 6 upon the rim of the vessel,—the hooks and foot giving a three point suspension for the basket. This is the position when the device is used for draining previously cooked material or when it is used in steaming or otherwise treating food. The other position of the basket is shown in Figure 3 and when it is desired to place the food within the vessel 1, it is merely necessary to lift the basket up slightly to disengage the hooks 8, move it rearwardly a slight distance and lower it into the vessel 1, as shown in Figure 3. In this position the hooks 8 and the basket are positioned within the vessel 1 while the arm 5 and foot 6 are positioned outside of the vessel.

This device lends itself readily to a variety of uses, as discussed above, for it may be most easily manipulated to cook the food within the vessel and, thereafter, lifted above the vessel to drain the excess liquid back into the vessel. Further the basket may be used with any type of vessel as it is not necessary to support the basket from the handle of the vessel. Consequently it may be used with a vessel which is not provided with a handle. In addition to this, the basket does not require any additional apparatus for its support, but is a complete entity in itself, functioning in the manner stated above.

It is to be noted further that the manner of forming the hooks as a continuation of the wire ring 7 provides a reenforcing member in the wire ring 7 for the bottom of the basket. In addition to this, as shown in Figure 3, this wire ring spaces the basket a slight distance upwardly from the bottom of the vessel so that burning of the food cannot occur.

It will be noted further that in shipping the baskets they may be nested one into the other without any possibility of the hooks catching into adjacent baskets as the ends of the hooks are joined by the member 9.

Further, it is to be noted that the device may be made very cheaply by ordinary processes and consequently may be marketed at a very low price.

Although the invention has been described in considerable detail, such description is intended as illustrative rather than limiting as the invention may be variously embodied and as the scope of such invention is to be determined as claimed.

I claim:

1. A cooking apparatus comprising an open top vessel, a basket having a handle extending from the top edge of the side walls, an arm extending downwardly from said handle and spaced from said side walls and terminating in a foot, a ring secured to the bottom of the basket and having its ends formed into hooks projecting outwardly from the bottom and located closely adjacent the bottom, the outer ends of the hooks being joined, whereby said basket may be placed within said vessel with the hooks located inside the vessel and the foot located outside, and said hooks and foot may be rested upon the rim of the vessel.

2. A cooking apparatus comprising an open top vessel, a basket having an outwardly extending handle having an arm extending downwardly from the handle, and a heavy reenforcing ring rigidly secured to the under side of the basket and following the contour of the periphery of the bottom of the basket and spaced from such bottom peripheral portion, the ring having an open portion adjacent the front of the basket and having a pair of hooks integral with such ring and projecting from the front bottom edge of the basket.

3. The combination of a frying pan drain basket, a wire ring secured to the bottom of the basket adjacent to the circumference, the front side of the wire ring being open, the portions of the wire adjacent to the open portion of the ring being disposed upwardly along the side of the basket, thence laterally, and then downwardly to provide two pairs of spaced arms which co-act to provide a pan engaging hook, the lower ends of the downwardly disposed portions being connected together.

In testimony that I claim the foregoing I have hereunto set my hand at Manitowoc, in the county of Manitowoc and State of Wisconsin.

ELMER E. DRUMM.